United States Patent
Lück

(10) Patent No.: US 9,109,364 B2
(45) Date of Patent: Aug. 18, 2015

(54) METHOD FOR FASTENING A COVER PLATE TO A FRAME STRUCTURE

(71) Applicant: Stefan Lück, Friedberg-Ockstadt (DE)

(72) Inventor: Stefan Lück, Friedberg-Ockstadt (DE)

(*) Notice: Subject to any disclaimer, the term of this patent is extended or adjusted under 35 U.S.C. 154(b) by 0 days.

(21) Appl. No.: 14/353,935

(22) PCT Filed: Oct. 24, 2012

(86) PCT No.: PCT/EP2012/004443
§ 371 (c)(1),
(2) Date: Apr. 24, 2014

(87) PCT Pub. No.: WO2013/060450
PCT Pub. Date: May 2, 2013

(65) Prior Publication Data
US 2014/0230354 A1    Aug. 21, 2014

(30) Foreign Application Priority Data

Oct. 28, 2011    (DE) .......................... 10 2011 117 145

(51) Int. Cl.
*E04B 1/74*     (2006.01)
*E04B 2/00*     (2006.01)
*E04B 1/80*     (2006.01)

(52) U.S. Cl.
CPC . *E04C 2/44* (2013.01); *E04B 1/803* (2013.01); *Y02B 80/12* (2013.01); *Y10T 29/49826* (2015.01)

(58) Field of Classification Search
CPC .......... E04B 1/803; E04C 2/34; E06B 3/6612
USPC ..................... 52/787.11, 788.1, 204.5; 428/34
See application file for complete search history.

(56) References Cited

U.S. PATENT DOCUMENTS

| 3,179,213 | A | * | 4/1965 | Kuelme et al. | ............... | 52/171.1 |
| 3,399,294 | A | * | 8/1968 | Thieben | .................... | 52/786.13 |
| 6,209,269 | B1 | * | 4/2001 | Valderrama | .................. | 52/786.1 |
| 6,220,685 | B1 | * | 4/2001 | Hirath et al. | ................. | 52/788.1 |
| 6,383,580 | B1 | * | 5/2002 | Aggas | ............................. | 428/34 |
| 2001/0026852 | A1 | | 10/2001 | Poix et al. | | |
| 2010/0281784 | A1 | * | 11/2010 | Leo | .................................. | 52/16 |

(Continued)

FOREIGN PATENT DOCUMENTS

| AT | 372 366 B | 9/1983 |
| AU | 29 254 71 A | 11/1972 |

(Continued)

OTHER PUBLICATIONS

International Search Report issued by the European Patent Office in International Application PCT/EP2012/0004443 on Feb. 5, 2013.

*Primary Examiner* — Mark Wendell
(74) *Attorney, Agent, or Firm* — Henry M. Feiereisen LLC

(57) ABSTRACT

A method for fastening a cover plate (6) to a frame structure (1) formed on the cover plate (6) is to easily and rapidly allow the erection of faces that are stable and durable in the long term and simultaneously, in the case of vacuum insulating panels, allow particularly good preservation of the vacuum in the panels. For this purpose, the frame structure (1) comprises a cavity (12), a number of channels (2) connecting the cavity (12) to the surface (4) and an opening (8) to connect a vacuum pump (10), the vacuum pump (10) being connected to the opening (8) and put into operation, the cover plate (6) being arranged on the surface (4) above the channels (2), and the cover plate (6) being fixed to the surface (4).

15 Claims, 1 Drawing Sheet

(56) References Cited

U.S. PATENT DOCUMENTS

| | | |
|---|---|---|
| 2011/0183119 A1 | 7/2011 | Rotter |
| 2011/0296771 A1* | 12/2011 | Miller et al. ............. 52/171.3 |

FOREIGN PATENT DOCUMENTS

| | | |
|---|---|---|
| DE | 68 00 533 U | 10/1969 |
| DE | 29 720 295 | 5/1998 |
| DE | 697 26 704 T2 | 10/2004 |
| DE | 10 2007 030 031 B3 | 2/2009 |
| DE | 20 2011 002 142 U1 | 6/2011 |
| WO | 10 2005 015 184 | 10/2006 |
| WO | WO 2009/118154 A1 | 2/2012 |

\* cited by examiner

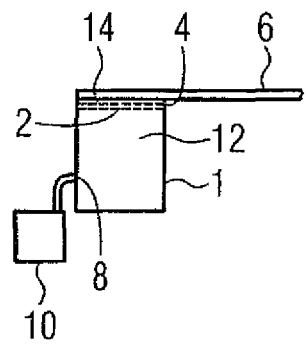
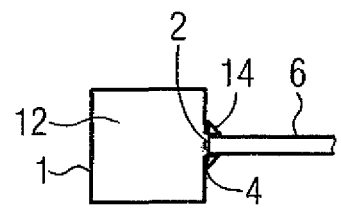
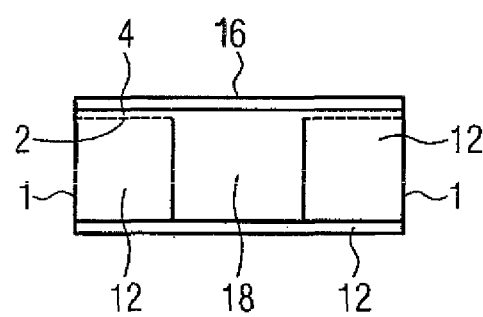
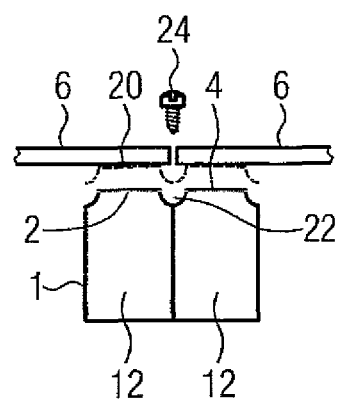
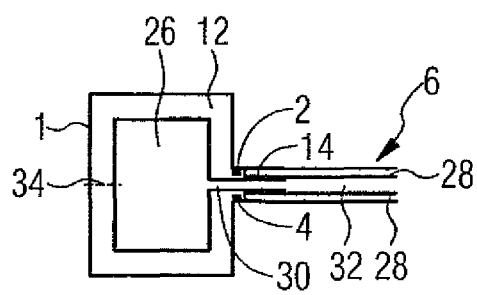
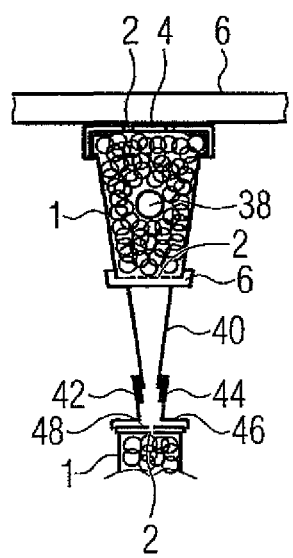

METHOD FOR FASTENING A COVER PLATE TO A FRAME STRUCTURE

CROSS-REFERENCE TO RELATED APPLICATIONS

This application is the U.S. National Stage of International Application No. PCT/EP2012/004443, filed Oct. 24, 2012, which designated the United States and has been published as International Publication no. WO2013/060450and which claims the priority of German Patent Application, Ser. No. 102011117145.6, filed Oct. 28, 2011, pursuant to 35 U.S.C. 119(a)-(d).

BACKGROUND OF THE INVENTION

The invention relates to a method for fastening a cover plate on a frame structure. It furthermore relates to a frame structure suitable for carrying out the method. Moreover, the invention relates to a method for fastening a cover plate comprising two cover layers arranged substantially parallel to one another on a frame structure and a frame structure suitable for carrying out the method.

One of the most important challenges for the future is to drastically reduce the consumption of raw materials. In particular in the building sector, considerable potential is untapped here both for future projects and in the existing situation. This applies both to the energy consumption produced by utilisation and grey energy, which is connected to the construction, preservation and demolition of buildings. A further challenge is to economically obtain renewable energy, as far as possible without competition with food production and nature conservation and to make it storable.

With regard to the energy consumed by building utilisation, on the one hand, the focus has recently been on improving heat insulation and, on the other hand, on the utilisation of renewable energies.

With regard to heat insulation, vacuum insulating panels (VIP) and vacuum insulating sandwich panels (VIS) are frequently used, the latter using a support core made of fumed silica, of mineral fibres or of other open-pore insulating materials, which allows the prevention of gas heat conduction at higher residual pressures. As a result, with lower requirements of the shell, the long-term securing of the vacuum in the panels is to be made possible. To obtain a high vacuum, in particular the edges of the panel would have to be configured with, for example, permeation-tight high-grade steel, which, in comparison to, for example, aluminised foil, would result in higher heat conduction via the edge regions. Thus, the achievable U-value would be higher, particularly in the case of smaller panels than is the case in film-covered VIPs.

On the other hand, in the case of vacuum insulating glazing (VIG) it is necessary for a high vacuum to be achieved as only small spacers, which must hardly hinder transparency, are installed. The particular challenge is both the edge connection, which has to combine minimum heat conduction with maximum diffusion-tightness and slightly resilient behaviour. Likewise, the ratio of volume to surface is problematic to achieve and maintain the high vacuum and requires very clean working and excellent cleaning of the surfaces before joining. VIGs of this type are, for example, known from DE 10 2005 015 184 A1. They typically comprise an easily held, massive frame structure with parallel cover layers attached thereto, the evacuation taking place outwardly through valves in the frame structure from the intermediate space between the cover layers.

With regard to the utilisation of renewable energies, buildings are frequently provided with photovoltaic panels. The installed faces are reaching greater and greater dimensions with thinner and thinner panel thicknesses (for example glass thicknesses of 2 mm to reduce the material costs) and, at the same time, the time and cost pressure is constantly increasing as the manufacturing deadline is often decisive for the level of compensation for the electricity feed into the grid.

SUMMARY OF THE INVENTION

It is therefore the object of the invention to disclose a method for fastening a cover panel, in particular a cover plate comprising two cover layers arranged substantially parallel to one another, such as, for example, a vacuum insulating panel or a photovoltaic panel on a frame structure as well as suitable frame structures for the methods, said frame structures easily and rapidly allowing the erection of faces that are stable and durable in the long term and, at the same time, allowing particularly good preservation of the vacuum in the panels in the case of vacuum insulating panels.

This object is achieved according to the invention by a method for fastening a cover panel on a frame structure formed on the cover plate, the frame structure having a cavity, a number of channels connecting the cavity to a surface and an opening for connecting a vacuum pump, with a vacuum pump being connected to the opening and put into operation, the cover plate being arranged on the surface above the channels and the cover plate being fixed to the surface.

The invention is based here on the consideration that a particularly easy erection of large panel faces could be achieved in that the utilisation of the vacuum technology should take place on site to fix and stabilise the panels as cover plates. The panels are sucked by the vacuum formation in the cavity and the air suction being produced by the channels onto the frame structure. As a result, the panels can be flexibly fastened to the frame structure on site and thus be assembled to form excellently stable elements of any desired size. The channels may be associated here both with the flat surface of the cover plate, so the panel rests on the frame structure, or with an edge region of the cover plate, so the latter is inserted in the frame. The vacuum can also be used to permanently fix the cover plate on the frame structure in the case of permanent sealing.

In an advantageous configuration, a sealing element is arranged between the surface and the cover plate. An elastomer may be used here, for example, which is attached as an additional seal between the hollow chamber profile and cover layer or is connected from the start to the cover layer or the frame. On integration into the frame profile, the elastomer should be punched or perforated in the same manner as the frame structure to allow the air suction.

In a further advantageous configuration, an adhesive is provided between the surface and cover plate. As a result, a permanent fixing of the cover plate to the frame structure is easily ensured. However, if it is intended to preserve the vacuum in the frame structure as a permanent fixing, the adhesive can be used as a fixing in the case of a loss of vacuum. For example, a thermoplastic adhesive film may be used here, which becomes flexible by heating and becomes solid after cooling. When demolishing or changing the cover layer, the components can be separated without destruction by reheating. However, all other adhesives suitable for the respective purpose of use/material combination can obviously also be used.

In a further advantageous configuration, a releasable mechanical connection means is attached between the surface and cover plate. This also allows an easy permanent fixing. For example, a clip connection constructed in the manner of a tongue and groove, push buttons, screw or hook-and-loop connections may be used here. The additional mechanical connection means may be glued to the cover plate, but not to the hollow chamber frame profile. When the cover layer is exchanged, the profile can therefore be further used directly and without cleaning work (for example removal of adhesive residues). The cover layers are also secure here against, for example, falling down, in the event of loss of vacuum. Additional security can be achieved by screwing to a plurality of points or by pressed-in rubber or other round cords or by other mechanical fastening means. In the case of a tongue and groove clip connection, the recess on the hollow chamber frame profile can also be used as a guide rail for the subsequent, for example, cutting processing of the cover layer. Cover layers with an oversize can thus be reworked after the cutting-free fastening.

For additional securing of the vacuum or for more flexible handling during construction, the frame structure can also be divided into a plurality of cavities. In addition or as an alternative, a plurality of cover plates is advantageously arranged and/or the frame structure has a plurality of cavities associated in each case with a cover plate. On the one hand, particularly large frame constructions can be achieved by this. On the other hand, cover plates can be attached to a plurality of sides of the frame structure. A particularly preferred application of a frame with contact faces on the two sides is also used to retrospectively attach plates (advertising media, photovoltaic modules etc.) to existing walls. In particular in the case of existing sandwich panels, which would otherwise have to be drilled through with screws or rivets, the advantages of the system clearly come to the fore. The load is distributed over the surface and the connection takes place without destruction.

Finally, a plurality of layers lying one above the other can also be produced by a configuration of this type, the cover plates themselves being connected to one another. The connection can also take place by means of conical or trapezoidal and therefore stackable struts with adjacent sleeves for fastening to the next cover plate.

In an advantageous configuration, the frame structure with the cover plate and a further closure body forms a central cavity and the central cavity is evacuated. This allows a permanent fixing of the panel and a simultaneous insulation of the entire face by the vacuum.

Advantageously, the pressure of the central cavity is below the pressure of the cavity of the frame structure here. To produce a high vacuum insulation in the central cavity, it is namely sensible to provide an additional barrier in the edge regions between the atmospheric pressure and the high vacuum. In the case of diffusion-tight cover layers, such as, for example, glass or aluminium or the like, the number of molecules entering through the cover layers is namely hardly a problem. On the other hand, molecules can penetrate relatively easily through the edge regions which should preferably be configured to be resilient and therefore tension-free. The cavity of the frame structure provides a simple possibility here: if the profile itself is brought to a rough vacuum (or fine vacuum) at about 0 to 200 mbar, there is virtually no pressure difference present between the frame profile and the high vacuum region. This lacking or only slight pressure difference limits the number of molecules entering the high vacuum region through the seal to a minimum. This is analogously produced from the calculation of leakage rates in vacuum systems, in which, apart from the size of the leakage, the pressure difference is the determining factor.

A frame structure, having a cavity, a number of channels connecting the cavity to a surface and an opening for the connection of a vacuum pump is advantageously suitable to carry out the described method.

The object is furthermore achieved by a method for fastening a cover plate comprising two cover layers arranged substantially parallel to one another on a frame structure formed on the edge region of the cover plate, the frame structure having a first cavity and a second cavity at least partially surrounding the first cavity, a number of channels connecting the first cavity to a surface and an opening to connect a vacuum pump, a vacuum pump being connected to the opening and being put into operation, the cover plate with its edge region on the surface being arranged above the channels in such a way that the latter are located between the two cover layers of the cover plate, and the first and the second cavity being evacuated, the second cavity having a higher pressure than the first cavity.

For applications in which the spacing between two cover layers has to be very small and a high vacuum insulation is simultaneously necessary between the cover layers, the frame structure can also be attached outside the cover layers. The hollow chamber profile is then to be produced with double walls and possibly to be provided with projections, on which, for example, glass panels are fastened. The profile in this case forms a vacuum buffer for the component and provides the possibility of integrating connections for vacuum pumps.

The frame structure is advantageously configured to be separable here in the region of the channels. In the case of minimal required spacings of the cover layers, the outer frame can namely be configured, for example, in two parts for the rough vacuum. In this case, the cover layers are clamped between the connection of the high vacuum profile and the rough vacuum profile.

A frame structure, comprising a first cavity and a second cavity at least partially surrounding the first cavity, a number of channels connecting the first cavity to a surface and an opening to connect a vacuum pump, is advantageously suitable to carry out the described method.

A cavity of the frame structure in this case advantageously comprises an open-pore insulating material. The integration of one or more layers of an open-pore insulating material with a free cavity remaining as an evacuation channel/layer allows the insulating effect to be significantly improved even in the case of higher residual pressures, or in the case of a higher residual molecule number than in the case of a high vacuum. As a result, the stability can also be increased in thin-walled frame structures, so the material outlay is reduced. For this purpose, both solid "blocks", which have evacuation channels, and pourable material and a combination of the two, can be used. The profile can also be foamed (observing the need for evacuation channels).

The use of expanded glass granulate as a filler material is particularly preferred as the total weight of the hollow profiles thus remains low. Depending on the purpose of use and site of use, other locally available fillers can also, however, be used—for example olive stones or other residual materials that satisfy the requirements (the suitability is highly dependent on the end pressure to be achieved). Empty tubes for the protected laying of, for example, cables in photovoltaic systems, and additional tubes provided with openings for better evacuations can be laid in the filling.

The frame structure in this case advantageously has a substantially trapezoidal cross-section. As a result, the frame structure can be stacked and is particularly easy to transport. In this case, the surface corresponding to the longer of the parallel sides of the trapezium is advantageously releasable.

As the hollow profiles of the frame structure namely have to be provided with holes in order to be connected to a plate, it is unnecessary to close them in the longitudinal direction. Therefore, channel-shaped parts, which can be stacked as described, can be produced, for example, by folding standard metal sheets. By attaching a cover plate, into which the channels are preferably directly introduced, as in the case of a change only the cover plate thus has to be renewed, which, for example, is folded in such a way that it can be connected to the channel-like part even without gluing, the hollow profile is then produced from two (or more) components on site. The stackability substantially reduces both storage and transport outlay.

In the case of a frame that can be evacuated and is filled with a pourable granulate (or other filling material), which is not frictionally glued together, or only to a limited extent, it is preferred to attach a perforated sheet or grid (possibly connected to an additional nonwoven) between a removable cover plate and the filling material. When the cover plate is removed, the content continues to remain in the frame and does not trickle out.

In a further advantageous configuration, the frame structure furthermore comprises an electric connection element. When using the hollow profiles as a sub-construction for, for example, frameless photovoltaic modules, a plug socket can be integrated. If the photovoltaic module is provided, for example, before assembly with a rigidly attached plug on the lower side, the connection is produced in one working step with the attachment to the hollow profile and there are no exposed cables that additionally have to be protected. Lamp systems can also, for example, be connected in the same manner.

The advantages connected with the invention are, in particular, that the use of the vacuum to construct and optionally permanently fasten a cover plate to a frame structure makes possible a particularly easy, rapid and tension-free construction of large-area insulating panels or photovoltaic panels. Moreover, when fastening VIG (vacuum insulating glass), a VIS (vacuum insulating sandwich) or VIP (vacuum insulating panel) to fixed cover layers, the edge composite of the vacuum insulating element is no longer exposed to atmospheric pressure. The service life of the vacuum is greatly increased. Additionally, by reversing the principle, i.e. applying pressure to the cavity, the cover layer can easily be released from the frame structure.

The frame structures described can also be joined to form timber frames or trussed frames and thus be used as frame structures for entire components, for example of a building or another large object. Complete frame constructions made of structures of this type, which are joined together to form a frame (analogously to steel or wood constructions), are also conceivable.

By using struts and the described channel-like frame profiles, the struts also being able to be stacked conically inside one another, as well as sleeves for the then narrow end of the struts, trussed frames can be stored and transported in a very space-saving manner. Prefabrication facilitates the joining on site and, owing to the gluing of the individual parts with or without an elastomer between the contact faces, the thermal loading is significantly reduced in comparison to welding. The use of fillers is sensible. Obviously, more complex trusses can also be produced in this manner, for example curved truss frames.

If the entire component encompassed by the frame construction is then evacuated, using the atmospheric pressure, with or without gluing, a large component with homogeneous stability can be produced from relatively small units.

An example of this is the rotor blades of wind turbine stations. According to the prior art, they are produced as a complete component in a composite mode of construction. The components that are sometimes over 50 m in size place high demands on the production and logistics and are not error-tolerant. Damage to the components often requires them to be exchanged, as repairs are only possible to a limited extent. The recyclability of products built in a composite mode of construction is also very low as the processed materials can hardly be separated into different types.

Monitoring large-area components, such as rotor blades of wind turbine stations, is also very complex and time-consuming. Electrically conductive layers, which allow monitoring for possible damage and provide an additional function for de-icing, increase the complexity and costs for production.

On the other hand, if a rotor blade is designed with a basic structure made of evacuated hollow frame profiles in the manner of the invention and is then provided with cover layers and spacers located in between and this sandwich being produced is then also evacuated, a substantial cost reducing potential is produced. The components can also be assembled without a great logistical outlay on site. A defect of a segment can immediately be established by vacuum measuring appliances, which are permanently connected. Eliminating this defect only requires a minimum outlay in comparison to conventional modes of construction as it is sufficient to exchange a small segment.

The atmospheric pressure, which acts uniformly on the complete component (excess and negative pressure, which act on the rotor blade during operation, change this value), in connection with resilient elements (for example elastomers between the cover layer and hollow frame profile and possibly additionally between cover layers and the core structure) ensures tension peak-free stability.

The mode of construction with hollow frame profiles that can be evacuated is furthermore excellently suited for the production of very large-volume, inherently stable components. If these are preferably rotationally symmetrical, the possibility is produced of evacuating them completely.

Depending on the size of the entire component and the weight of the materials used, the evacuation of the component content can thus achieve a significant weight reduction, which results in the fact that the component can be moved at least with substantially less use of energy, or becomes so light that its weight is below that of the displaced air.

Lighter-than-air technologies, which are prior art for example in airships, use mainly hydrogen or helium as the "buoyancy means". While hydrogen will probably only be used in exceptional cases because of the dangers in handling it, in the case of helium, the availability and price are a severely limiting factor.

The pressure difference, which is produced during an evacuation, for example of a cylindrical component between the atmospheric pressure and the component content, requires a very stable shell structure. The mode of construction, which is described in the previous paragraphs, allows the required stability.

A large advantage compared to, for example, airships with conventional supporting gases is the possibility of being able to ensure a rapid balancing and a targeted, rapid landing owing to the targeted flooding of smaller separate segments in the hollow body, without using additional ballast. The pressure difference, which is present in relation to the atmospheric pressure, facilitates this object. Likewise, no expensive supporting gas is lost in this process; it merely has to be reevacuated into the flooded regions again.

The extremely simple mode of construction and the excellent recyclability that the invention offers, makes completely new purposes of use possible for the lighter-than-air technology. Thus, an "airship" can be constructed, the shell of which is used as a housing at the site of use. Specifically in the case of catastrophes, such as, for example earthquakes, in which the complete infrastructure is destroyed, the transportation of relief supplies is a logistical challenge that can hardly be overcome. With a "disposable airship" of this type, the material required on site itself becomes the transportation means. All the materials, which are required for construction, can be 100% supplied for a new purpose of use.

By using photovoltaically active surfaces, the energy required for construction and operation of the "airship" can be produced locally. The photovoltaic elements used can also then ensure here a basic supply on site.

When constructing cooling towers, solar updraft towers or other rotationally symmetrical constructions, the production can take place horizontally and the entire shell then brought into the upright position. The use of cranes and cladding for the construction is thus substantially avoided and the shell can be used as lost formwork depending on the requirement. Holders for pouring in concrete or other filling materials can be integrated during construction.

It is also possible to use a construction body of this type as a framework and weather protection for constructing high rise buildings. Holders to attach further framework components can be integrated into the shell, additional reinforcing elements can be attached during the progress of the construction and the function of cranes can be replaced. After completing the construction, the shell can be completely removed but it can also be integrated completely or in parts into the construction.

BRIEF DESCRIPTION OF THE DRAWING

The invention will be described in more detail below with the aid of the drawings, in which FIG. 1 shows a cross-section of a frame structure with a cover plate resting on the outside, FIG. 2 shows a cross-section of a frame structure with an enclosed cover plate, FIG. 3 shows a cross-section of a frame structure with a central, evacuated cavity, FIG. 4 shows a cross-section of a divided frame structure with a clip connection, FIG. 5 shows a cross-section of a double-walled frame structure with an enclosed cover plate with two cover layers and FIG. 6 shows a cross-section of a trussed frame with a trapezoidal frame structure and struts.

DETAILED DESCRIPTION OF PREFERRED EMBODIMENTS

The same parts are provided in all the figures with the same reference numerals.

FIG. 1 schematically shows a cross-section of a frame structure 1. The latter has a number of channels 2 towards a surface 4, on which a cover plate 6 is to be fastened. Furthermore, the frame structure 1 has an opening 8, to which a vacuum pump 10 is connected. The vacuum pump 10 is put into operation so that the cavity 12, which is gas-tight except for the described channels 2 and opening 8, has a negative pressure in comparison to the surroundings.

The cover plate 6 is then brought over the channels 2 and fixed there, free of tension, by the suction of the negative pressure in the cavity 12. For better retention and to reinforce the suction, a sealing element 14 is arranged here, said sealing element having holes adapted to the channels 2, so air can pass, but being sealed towards the exterior.

For a permanent fixing of the cover plate 6, the vacuum pump 10 is now removed and the opening 8 closed, so the negative pressure in the cavity 12 is permanently maintained. At the same time, an adhesive is provided between the surface 4 and cover plate 6. This ensures secure retention even in the event of a loss of vacuum in the cavity 12. Alternatively, only the adhesive may also be provided for retention. This allows a rapid and tension-free attachment, for example of a photovoltaic element as the cover plate 6.

A further embodiment is shown in FIG. 2. (The vacuum pump 10 is no longer shown in any of the further figures.) The surface 4 faces the edge here, i.e. the edge region of the cover plate 6. The function here is analogous to FIG. 1. A configuration of this type may, for example, be advantageous for vacuum insulating panels as cover plates 6, as the edge regions are protected against loss of vacuum here by the vacuum in the cavity 12 in the case of permanent evacuation.

FIG. 3 shows an embodiment similar to FIG. 1. The sealing elements 14 are not shown separately. The frame structure 1, together with a closure body 16—also a cover plate in the embodiment—forms a central cavity 18, which is permanently evacuated together with the cavity 12. In this case, only a rough vacuum is adjusted in the cavity 12 and a high vacuum in the central cavity 18. The rough vacuum minimises the leakage rate from the cavity 18.

FIG. 4 shows an embodiment with an alternative fastening compared to FIG. 1. The frame structure 1 is divided into two cavities 12 that can be evacuated separately, which are in each case associated with a cover plate 6. As a result, cover plates 6 can be attached separately. The permanent fastening is achieved by a clip connection 20 configured as a spring and attached to the cover plate 6, the frame structure 1 having grooves 22 adapted thereto. Additionally, the cover plates 6 may be fastened by means of a screw 24. The configuration according to FIG. 4 allows a residue-free disassembly and reuse of the frame structure 1. The disassembly can be facilitated by applying pressure to the cavity 12.

Finally, FIG. 5 shows a configuration with a frame structure 1, which encompasses a further cavity 26 within the cavity 1. The channels 2 in each case face the edge regions of two parallel cover layers 28 and function according to the plan already described. A further channel 30 however connects the inner cavity 26 to the interior 32 of the cover plate 6, corresponding sealing elements 14 again being attached.

The inner cavity 26 and the interior 32 are evacuated to a high vacuum, so the cover plate 6 acts in an insulating manner. The cavity 12 has a rough vacuum, which, on the one hand, fixes the cover layers 28 to the frame structure 1 and, on the other hand, is used as a protective vacuum for the high vacuum. The leakage rate is thus minimised. The frame structure 1 (even in the remaining embodiments) can be configured to be separable at a dividing face 34. This facilitates assembly in the case of very thin cover plates 6.

Finally, FIG. 6 shows a further embodiment of the frame profile 1 with channels 2 at the upper and lower side. The frame profile 1 is configured as a trapezoidal metal sheet open at the top, whereby it can be stacked. A cover plate 36 with channels 2 forms the upper surface 4 of the frame profile 1. The two parts are rigidly connected by the evacuation. The inside of the frame profile 1 is filled with a filler, for example sand, an evacuation channel 38 remaining.

The cover plate 6 at the lower end of the frame structure 6 has a conical continuation, which forms a strut 40. This is open at its lower side and a sleeve 44 is formed on it by means of a sealing element 42. The sleeve 44 is also conical and hollow and, at its lower end, forms a surface 46, to which a frame profile 1 arranged the other way round to the first frame profile 1 is adapted. The surface 46, however, also has a channel 48, so the vacuum from the lower frame profile 1 extends into the sleeve and strut and thus fixes it.

The invention claimed is:

1. A method, comprising:
  drawing through an opening of a frame structure a vacuum in a cavity of the frame structure by connecting a vacuum pump to the opening of the frame structure;
  placing a cover plate upon a surface of the frame structure onto a number of channels of the frame structure which fluidly connect the surface with the cavity, with the cavity being gas-tight except for the channels and the opening; and
  fixing the cover plate on the surface of the frame structure.

2. The method of claim 1, further comprising arranging a sealing element between the surface and cover plate.

3. The method of claim 1, further comprising applying an adhesive between the surface and cover plate.

4. The method of claim 1, further comprising providing a releasable mechanical connection between the surface and cover plate.

5. The method of claim 1, wherein a plurality of said cover plate is placed upon the surface.

6. The method of claim 1, wherein the frame structure has a plurality of cavities associated to a plurality of cover plates on one-to-one correspondence.

7. The method of claim 1, wherein the frame structure with the cover plate and a further closure body forms a central cavity, said central cavity being evacuated.

8. The method of claim 7, wherein a pressure of the central cavity is below a pressure of the cavity of the frame structure.

9. A method for fastening a cover plate to a frame structure, comprising:
  drawing through an opening of a frame structure a vacuum in a first cavity and a second cavity of the frame structure, with the second cavity at least partially surrounding the first cavity, by connecting a vacuum pump to the opening of the frame structure;
  placing an edge region of a cover plate upon a surface of the frame structure a number of channels of the frame structure, which fluidly connect the first cavity to the surface, such that the channels extend between two substantially parallel cover layers of the cover plate; and
  evacuating the first and the second cavities such that the second cavity has a pressure which is higher than a pressure of the first cavity.

10. The method of claim 9, wherein the frame structure is configured to be separable in a region of the channels.

11. A frame structure, comprising:
  a first cavity;
  a second cavity at least partially surrounding the first cavity;
  a number of channels fluidly connecting the first cavity to a surface of the frame structure; and
  an opening for connection of a vacuum pump to apply a vacuum in the first and second cavities to thereby draw an edge region of a cover plate, placed upon the surface of the frame structure onto the number of channels such that the channels extend between two substantially parallel cover layers of the cover plate, and to evacuate the first and the second cavities such that the second cavity has a pressure which is higher than a pressure of the first cavity.

12. The frame structure of claim 11, further comprising an open-pore insulating material provided in at least one of the first and second cavities.

13. The frame structure of claim 11, configured to have a cross-section substantially in the form of a trapezium.

14. The frame structure of claim 13, wherein the surface corresponds to a longer one of parallel sides of the trapezium and is releasable.

15. The frame structure of claim 11, further comprising an electric connection element.

* * * * *